(12) United States Patent
Tsubaki et al.

(10) Patent No.: US 7,057,110 B2
(45) Date of Patent: Jun. 6, 2006

(54) POWER FEEDING DEVICE

(75) Inventors: Akira Tsubaki, Shizuoka (JP); Tatsuro Matsuo, Shizuoka (JP); Takahiro Iwasaki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/144,617

(22) Filed: Jun. 6, 2005

(65) Prior Publication Data
US 2006/0021781 A1 Feb. 2, 2006

(30) Foreign Application Priority Data
Jul. 30, 2004 (JP) ............................. 2004-222937

(51) Int. Cl.
*H02G 1/00* (2006.01)

(52) U.S. Cl. ...................... 174/72 A; 174/69
(58) Field of Classification Search ............. 174/72 A, 174/72 C, 69, 70 R
See application file for complete search history.

(56) References Cited

U.S. PATENT DOCUMENTS

2002/0005014 A1 * 1/2002 Doshita et al. ............... 49/360

FOREIGN PATENT DOCUMENTS

JP 11-342807 12/1999

* cited by examiner

*Primary Examiner*—Jinhee Lee
(74) *Attorney, Agent, or Firm*—Armstrong, Kratz, Quintos, Hanson & Brooks, LLP

(57) ABSTRACT

Providing a compact power feeding device having a smooth slide operation, a power feeding device includes a wiring harness being received in a case to be formed into a U-shape, a slider capable of sliding freely in the case, and a slot being provided between one leg and the other leg of the wiring harness. The one leg of the wiring harness is fixed on the case, and the other leg thereof is led out to an outside of the case through the slider. The slider is disposed from a wall of the case, along the other leg of the wiring harness, to the slot. The case has a rail, and the slider has an engaging member corresponding to the rail. The slider has also a swivel member swiveling freely, and the other leg of the wiring harness is led out through the swivel member to the outside.

3 Claims, 3 Drawing Sheets

POWER FEEDING DEVICE

The priority application Number Japan Patent Application 2004-222937 upon which this patent application is based is hereby incorporated by reference.

BACKGROUND OF THE INVENTION

1. Field of the Invention

This invention relates to a power feeding device having a wiring harness bent into a U-shape to be received in a case for feeding electric power continuously to a movable structure such as a slide door and a slide seat of a vehicle.

2. Description of the Related Art

FIG. 4 shows a usual power feeding device (refer Patent Reference 1).

A power feeding device 41 is installed in a slide door 42 of a vehicle. In the power feeding device 41, a flat wiring harness 45 bent into a U-shape is received in a long sideways case 44, and a slider 46 is provided slidably within the case 44, and one leg of the wiring harness 45 is fixed on the slider 46 and the other leg of the wiring harness 45 is fixed on the case 44.

The slider 46 is connected with a vehicle body 43 by a flexible arm 43. A wiring harness 48 of the vehicle body 43 is wired from one leg of the wiring harness 45 along the arm 47 toward an electric power supply. The other leg of the wiring harness 45 is connected with a wiring harness at the slide door 42 toward an auxiliary device (not shown) such as a motor for a power regulated window, a door lock unit, a switch unit.

The flat wiring harness 45 is provided with a flexible support plate for preventing slack of the wiring harness 45. The case 44 has a bottom wall. The wiring harness 45 is formed into the U-shape along a top wall 49 and the bottom wall parallel to the top wall 49 of the case 44.

When the slide door 42 in a condition of partly open as shown in FIG. 4 is moved forward as an arrow A for slot, the slider 46 moves relatively toward a rear of the case 44, and the wiring harness 45 is curved into the U-shape to have a top part 45a and a bottom part 45b of almost same lengths. When the slide door 42 in a condition of partly open as shown in FIG. 4 is moved rearward as an arrow B for closing, the slider 46 moves relatively toward a front of the case 44, and the wiring harness 45 is curved in the J-shape to have the shorter bottom part 45b than the top part 45a. Thus, the slack of the wiring harness 45 is absorbed so as to provide continuously electric power securely to each auxiliary device in the slide door.

Reference Patent 1 is Japan Patent Application Laid Open No. H11-342807.

SUMMARY OF THE INVENTION

Objects to be Solved

In the usual power feeding device 41, the wiring harness 45 is formed with a flat wire and the flexible support plate is required for preventing the slack of the wiring harness 45 in the case. Therefore, assembling cost and parts cost for the support plate are required.

An applicant of the present invention invented a power feeding device as shown in FIG. 5 by using a usual wiring harness with a round cross-section instead of the flat wiring harness.

A power feeding device 51 includes a case 52 made of synthetic resin and a slider 54 slidable along a bottom wall 53 of the case 52. A wiring harness 55 is received in the case 52 to be curved in a U-shape or J-shape. One leg of the wiring harness 55 is fixed on the slider 54 and the other leg of the wiring harness 55 is fixed on a top wall 56 of the case 52.

The case 52 is formed into a rectangular shape having side walls 56, 53 in parallel to each other at a top edge and a bottom edge of the case. The slider 54 is formed with a top half portion 54a and a bottom half portion 54b. The bottom half portion 54b projects downward from the bottom wall 53. The wiring harness 55 is wired by curving into a crankshaft shape from the top portion 54b to the bottom portion 54b, and led out from the bottom portion 54b toward a movable structure such as a slide door.

In case of applying the power feeding device 51 to a slide door of a vehicle, when the slide door is opened, the slider 54 moves relatively toward a front side in the case 52 as shown with a two-dot chain line, and a bottom half portion 55b of the wiring harness 55 slides forward along the bottom wall 53 of the case 52. When the slide door is closed, the slider 54 moves relatively toward a rear side in the case 52 as shown with solid line, and the bottom half portion 55b of the wiring harness 55 slides rearward along the bottom wall 53 of the case 52. The case 52 moves forward and rearward integrally with the slide door. The slider 54 moves relatively short, and is placed in a home position together with a harness part 57 for connecting with a vehicle body.

The power feeding device 51 can be applied to a slide seat, a rotary backdoor, a trunk and a slide door of a machine other than the vehicle. The slide door, the slide seat and the like are called as a moving structure and a power feeding side such as the vehicle body is called as a fixed structure.

According to the above power feeding device 51, a bottom half portion of the slider projects downward from the case. Therefore, a distance from the top end of the case to a bottom end of the slider increases and height of the power feeding device increases. The bottom half portion of the slider would interfere with an outside object during sliding motion. It will cause not to slide the slider smoothly and a look of the power supply becomes worse.

To overcome the above problem, object of this invention are to provide a power feeding device, which is compact and has a smooth sliding motion to prevent increase of the power feeding device caused by the projected slider and interference of the slider and the outside objects.

How to Attain the Object of the Present Invention

In order to attain the object of the present invention, a power feeding device according to an aspect of the present invention includes a wiring harness being received in a case to be formed into a U-shape, a slider capable of sliding freely in the case, and a slot provided between one leg and the other leg of the wiring harness. The one leg of the wiring harness is fixed on the case, and the other leg thereof is led out to an outside of the case through the slider. The slider is located between a wall of the case along the other leg of the wiring harness and the slot. The other leg of the wiring harness is led out from the slot to the outside.

According to the above structure, the slider is received completely in the case, and the one end of the slider is positioned along the wall of the case. The other leg of the wiring harness is wired from one end of the slider and to the other end thereof and led out to the outside from the slot between the one leg and the other leg of the wiring harness. The wiring harness is curved into a U-shape and a part of the wiring harness wired to the slider is wired from the one leg to the other leg of the wiring harness. The one leg of the wiring harness is positioned along one wall of the case. The other leg of the wiring harness is positioned along the other wall of the case. The other leg of the wiring harness is curved at the slider toward the one leg of the wiring harness. Thereby, friction drag between the other leg and the wall of the case is reduced and operatability of the slider is improved.

The power feeding device according to another aspect of the present invention is characterized in the power feeding device mentioned above in that the case is provided with a rail, and the slider is provided with an engaging member corresponding to the rail.

According to the above structure, the slider can smoothly move forward and rearward along the rail of the case at a home position. The rail is preferably formed integrally with the case made of synthetic resin about costs of a part and assembling.

The power feeding device according to further aspect of the present invention is characterized in the power feeding device mentioned above in that the rail is placed in the vicinity of the slot.

According to the above structure, the slot is located at a middle position in height of the case, and the rail is placed in the vicinity of the slot, that is, in a middle position in height of the case. A middle portion in height of the slider engages with the rail. Thereby, the slider can slide freely and stably in the case without sticking motion.

The power feeding device according to further aspect of the present invention is characterized in the power feeding device mentioned above in that a swivel member is provided to swivel freely at said slider, and the other leg of the wiring harness is led out through the swivel member to the outside.

According to the above structure, the swivel member swivels corresponding to movement of the slider so as to absorb a bending force and a twisting force at a lead out side of the wiring harness smoothly. When the power feeding device is installed in the moving structure, the wiring harness at the lead out side is wired toward the fixed structure (power supply side). When the moving structure moves, the slider moves relatively and the swivel member swivels in an opposite direction of movement of the moving structure.

The above and other objects and features of this invention will become more apparent from the following description taken in conjunction with the accompanying drawings.

DESCRIPTION OF THE PREFERRED EMBODIMENT

Figures 1, 2:
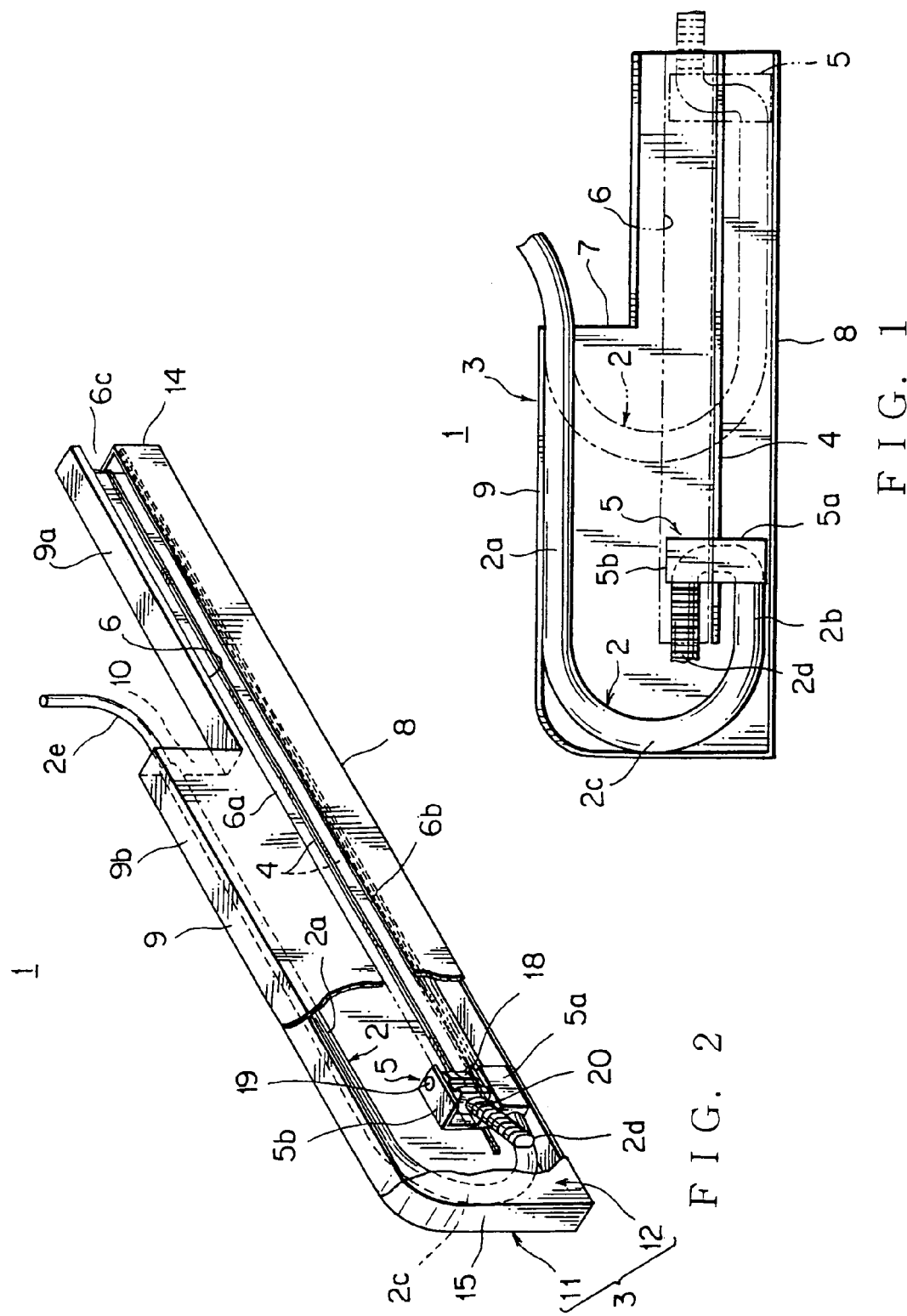
FIG. 1 is a front view of an embodiment of a power feeding device according to the present invention.
FIG. 2 is a perspective view of the power feeding device, in which a slider moves to one side.
Figure 3:
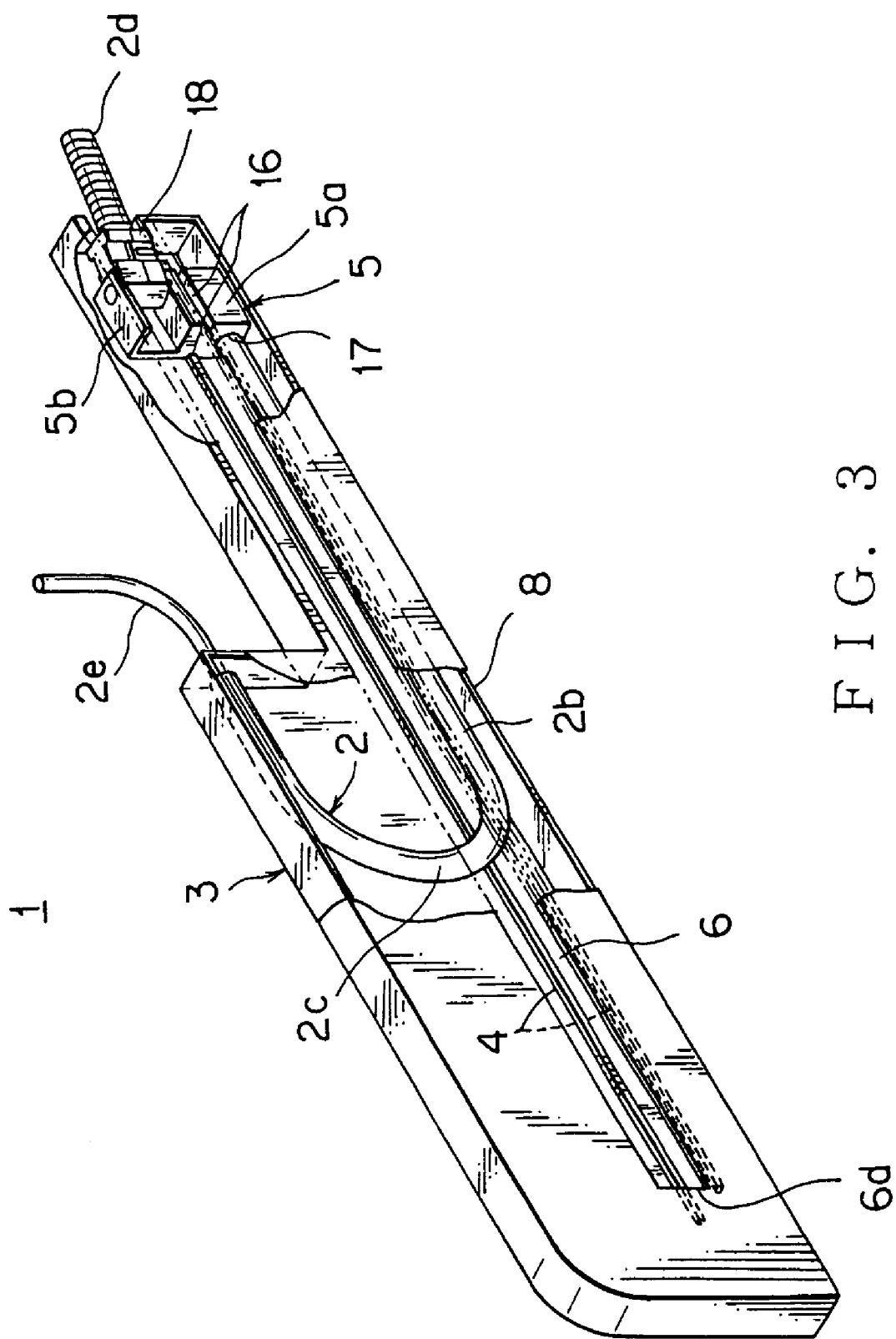
FIG. 3 is a perspective view of the power feeding device, in which the slider moves to the other side.
Figure 4:
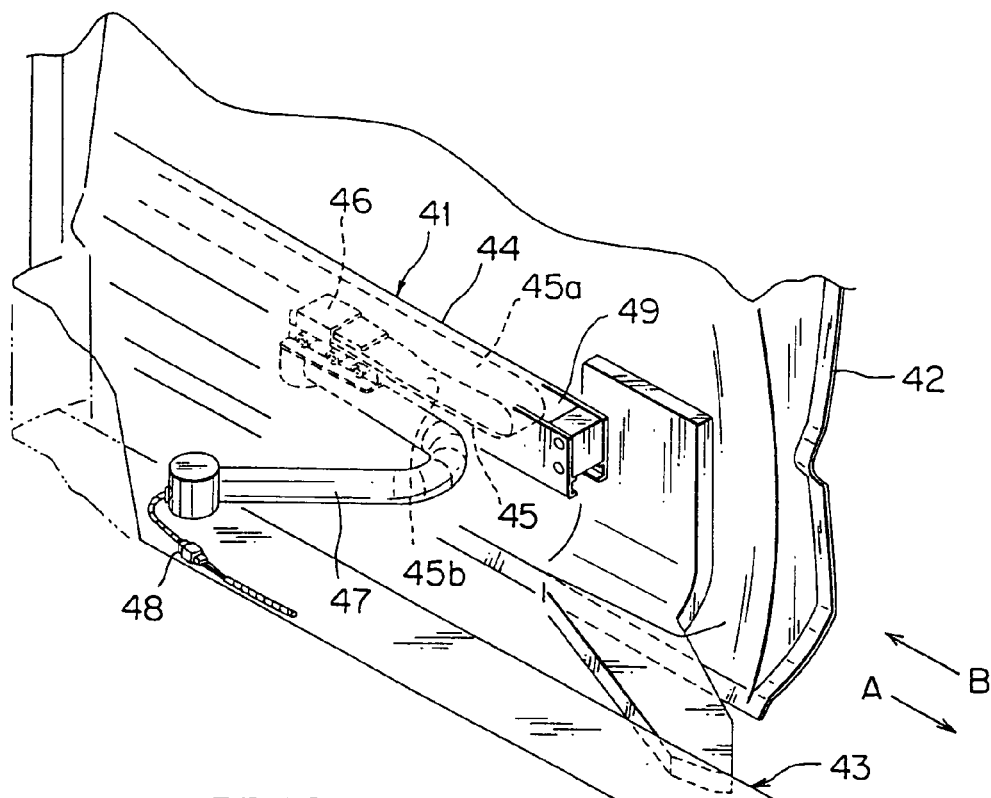
FIG. 4 is a perspective view of one power feeding device by prior art.

FIGS. 1–3 show an embodiment of a power feeding device according to the present invention. FIG. 1 is an illustration of the power feeding device. FIGS. 2 and 3 show respective conditions of a moved slider of the power feeding device.

A power feeding device 1 includes a long sideways case 3 made of synthetic resin for receiving a wiring harness 2 formed into a U-shape or J-shape, and a slider 5 slidable along a rail 4 at a middle position in height of the case 3. A bottom half portion 5a of the slider 5 engages with the rail 4. A long sideways slot 6 for leading out the wiring harness 2 is located above the rail 4 at the case 3. A top half portion 5b of the slider 5 is positioned in the slot 6. The wiring harness 2 is wired from the bottom half portion 5a to the top half portion 5a of the slider 5. The wiring harness 2 is led out from the top half portion 5b through the slot 6 to an outside.

The case 3 is formed into a rectangular-like shape, which has a narrow-width front half portion and a wide-width rear half portion. The front half portion and the rear half portion of the case 3 are continued through a step 7 at a top side of the case 3. A bottom wall 8 of the case 3 is formed straight from a front end to a rear end horizontally. A top wall 9 of the case 3 has a low front half portion 9b and a high rear half portion 9b. The front half portion 9a is shorter than the rear half portion 9b.

A vertical opening 10 is provided at the step 7 of the top side. A top-side portion (one leg) 2a of the wiring harness 2 is fixed at the opening 10. The wiring harness 2 is fixed with an extension plate (not shown) of the top wall 9 by taping or banding.

The case 3 has a base 11 and a cover 12. The base 11 includes a vertical base wall 13 (FIG. 12) and walls 9, 8, 14, 15 at a top edge, a bottom edge, a front edge, and a bottom edge around the base wall 13. The cover 12 is formed with one plate member. The base 11 and the cover 12 are secured to each other by an engaging means (not shown) such as a lock projection and an engaging hole. In FIG. 1, the cover 12 is not shown.

The cover 12 is provided with a long sideways slot 6. The slot 6 is formed by cutting out the cover 12 in a horizontal direction from a front end toward a vicinity of a rear end of the cover 12. The slot 6 has top and bottom edges 6a, 6b in parallel to each other, and an slot edge 6c and an end edge 6d at a rear-side. The slot 6 is located at a middle position in height of the cover 12, that is, case 3. At the narrow-width front half portion of the case 3, the top edge 6a of the slot 6 almost corresponds to an inner surface of the top wall 9a of the base 11.

A pair of rails 4 is provided oppositely to each other at an inner surface of the cover 12 and at an inner surface of the base 11 in the vicinity of the bottom edge 6b of the slot 6. The rail 4 is formed into a triangle or rectangular in cross-section. The rails 4 are preferably formed integrally with the cover 12 and the base 11 by resin molding.

The top half portion 5b and the bottom half portion 5a of the slider 5 are formed integrally with synthetic resin. The top half portion 5b is formed into an inverted L-shape in cross-section. The bottom half portion 5a is formed into a rectangular block shape. The top half portion 5b has a vertical wall extending from the bottom half portion 5a and a horizontal wall perpendicular to the vertical wall. Horizontal grooves 16 (engaging members FIG. 3) engaging slidably with the pair of rails 4 are provided at both right-and-left sides of a top side of the bottom half portion 5a.

Preferably, the bottom half portion 5a of the slider 5 can be divided into top-and-bottom blocks or right-and-left blocks. Each divided block is provided with a groove having a semi-circle cross-section for holding the wiring harness 2. By combining both grooves, a harness through hole 17 (FIG. 3) with a circle cross-section is formed to extend through a top wall of the bottom half portion 5a. The groove is preferably formed on an inner surface with a rib engaging with a round groove of a corrugated tube (protecting tube) for protecting an outer surface of the wiring harness 2. The harness through hole 17 is curved into a circular arc from a rear end of the bottom half portion 5*a* to a top end thereof. Both divided blocks are locked with each other by locking means, such as a lock hook and engaging recess (not shown). One divided block is continued integrally to the converted L-shape top half portion 5*b*.

A rectangular swivel block (swivel member) 18 is connected rotatably about a vertical shaft 19 with the top half portion 5*b* of the slider 5. The swivel block 18 is preferably divided into an upper and a lower portions, and locked with each other by locking means (not shown) such as a locking hook and engaging recess. Each block is provided with a groove having a semi-circular or an arc cross-section to form the harness through hole 20 (FIG. 2) having a circular cross-section or an elliptical cross-section. The harness through hole 20 is curved from a bottom surface of the swivel block 18 to a top surface thereof, and continued to the harness through hole 17 of the bottom half portion 5*a* of the slider 5.

The swivel block 18 in this embodiment is provided on the inner surface of the harness through hole 20 with a rib. The round groove of the corrugated tube having an elliptical cross-section of the wiring harness at a side of the swivel block engages with the rib. The wiring harness 2 is wired curvedly as a plurality of electrical wires without the protecting tube in the swivel block 18 and the slider 5. Each end of the protecting tubes are fixed at the rear end of the bottom half portion 5*a* of the slider 5 and at the top end of the swivel block 18. The plurality of electrical wires is led out from an inside of the case 3 through the swivel block 18 to an outside of the case 3. The swivel block 18 swivels forward and rearward in the long sideways slot 6.

Figure 5:
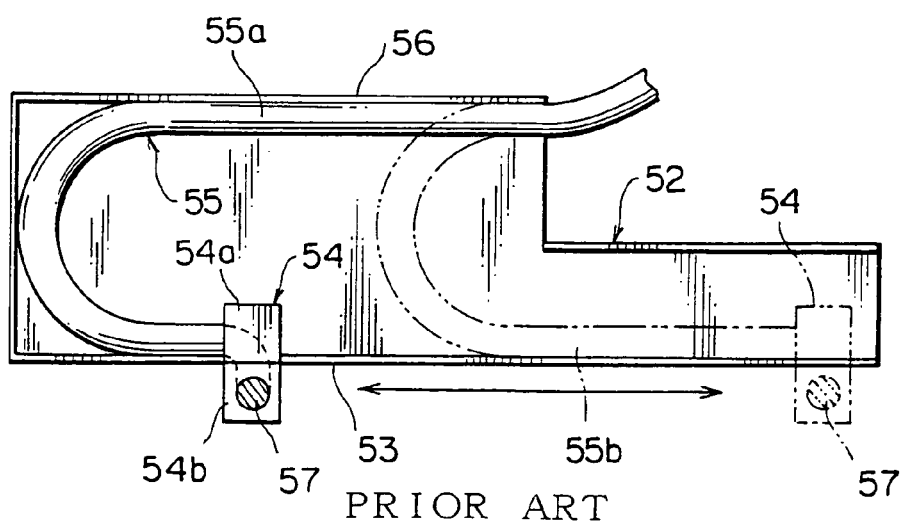
FIG. 5 is a front view of another power feeding device by prior art.

In this embodiment, a part of wiring harness 2*d* at the outside of the case 3 can swivel freely by using the swivel block 18. As the prior art (FIG. 5) by removing the swivel block 18, the wiring harness 2 can be led out directly from the top half portion 5*b* of the slider 5 through the slot 6 to the outside.

As shown with the solid line in FIG. 1 and shown in FIG. 2, when the slider 5 moves to the rear area of the case 3, the top-side portion 2*a* of the wiring harness 2 becomes longer than a bottom-side portion (the other leg) 2*b* of the wiring harness 2. The top-side portion 2*a* is placed straightly along the inner surface of the top wall 9 of the case 3, and a curved portion 2*c* of the wiring harness 2 is placed curvedly in a semi-circular shape at the rear end of the case 3. The wiring harness 2 is stiffer than the usual flat wiring harness so that the wiring harness 2 does not dangle. The swivel block 18 rotates obliquely rearward. The bottom-side portion 2*b* of the wiring harness 2 continued to the curved portion 2*c* goes from a bottom to a top in the slider 5 and is led out from the top-side of the swivel block 18 through the slot 6 to oblique rearward.

The slot 6 and the swivel block 18 are placed between the top-side portion 2*a* and the bottom-side portion 2*b* of the wiring harness 2 at the middle position in height of the case 3. According to this structure, the power feeding device 1 is shortened in height comparing with a usual structure, in which a slider projects under a case. The whole slider is received completely in the case so that there is no chance that the slider 5 interferes with an outside object. A look of the power feeding device is improved.

The wiring harness 2 between the top-side portion 2*a* and the bottom-side portion 2*b* is led out to outside. Thereby, the wiring harness 2 has no unexpected bending force and no unexpected torsional force comparing with a usual structure that the wiring harness 2 is led out from an area under the bottom-side portion to outside. Therefore, the slider 5 can move smoothly and an operation force for slider 5 can be reduced.

When the slider 5 moves to the front area of the case 3 as shown in FIG. 3, the bottom-side portion 2*b* of the wiring harness becomes longer than the top-side portion 2*a* thereof, and the bottom-side portion 2*b* is supported straightly along the bottom wall 8 of the case 3. The curved portion 2*c* of the wiring harness 2 is located at a middle position in length of the case 3. The swivel block 18 rotates obliquely forward.

In a case that the above power feeding device 1 is installed in a left slide door of a vehicle, FIG. 2 shows a condition of closing completely the slide door, and FIG. 3 shows a condition of slot fully the slide door. The top-side portion 2*a* of the wiring harness 2 is connected through a fix point of the case 3 with a connector of a wiring harness for auxiliary devices such as a motor for a power regulated window, a door lock unit, a door mirror unit, a courtesy lamp, a switch unit and the like at the slide door. The part of wiring harness 2*d* led from the swivel block 18 is connected, through a space between the slide door and a vehicle body, with a connector of a wiring harness of the vehicle body (power supply side).

The above power feeding device 1 can be installed in the vehicle body. In this case, parts of lead-out wiring harnesses 2*e*, 2*d* at top-side and bottom side are connected oppositely. For a slide seat, the above power feeding device 1 can be installed horizontally so as to connect the part of wiring harness 2*d* at the swivel block 18 and auxiliary devices in the slide seat, and connect the part of wiring harness 2*e* at fixed side and a power supply side.

The power feeding device can be applied to any doors other than the door of the vehicle. For example, for a door moving up-and-down, the above power feeding device 1 can be placed to arrange lengthwise thereof in a direction of up-and-down so as to the part of wiring harness 2*d* at the swivel block and the door, and connect the part of wiring harness 2*e* at the fixed side and the power supply side. Thus, the power feeding device can be arranged for usage.

In the above embodiment, the groove 16 of the slider engaged with the rail 4 can be replaced by a pulley. The rail 4 can be changed from two rails to one rail. In the case of one rail, by taking the slider 5 in the case 3 without looseness in a direction of thickness of the case 3, the slider 5 can slide smoothly. As a rail, a projected line and the groove 16 can be replaced by a long slit (not shown) and a shaft engaged with the long slit.

Having now fully described the invention, it will be apparent to one of ordinary skill in the art that many changes and modifications can be made thereto without departing from the scope of the invention as set forth herein.

What is claimed is:

1. A power feeding device comprising:
    a case having a bottom wall formed from a front end to a rear end, a top wall, and an opening at a top end of the case for leading out a wiring harness therethrough from an inside of the case to an outside of the case;
    said wiring harness being received in the case as being bent into a U-shape with a substantially constant curvature radius;
    a slider being freely slidable within said case; and
    a slot being provided on the case in between U-shape legs of the wiring harness, the slot being provided substantially from the front end to the rear end of the case, in the middle position in height of said case between said top wall and bottom wall of the case;

wherein one leg of said wiring harness is fixed to the case in the vicinity of the opening of the case, and the other leg thereof is led out to the outside of the case by the slider from the slot, said slider is disposed from the bottom wall of the case, along the other leg of the wiring harness, to the slot, and said slider is provided with a swivel member to swivel freely, the swivel member being located within the case.

2. The power feeding device according to claim 1, wherein said case is provided with a rail located in parallel to the length of said case below said slot, and the bottom half portion of said slider is provided with an engaging member corresponding to the rail.

3. The power feeding device according to claim 1 or 2, wherein said slider is provided with the swivel member to swivel freely, said swivel member being connected rotatably about a vertical shaft with the top half portion of said slider, said swivel member containing a circular cross-section or an elliptical cross-section forming a harness through-hole, and said other leg of the wiring harness is led out from an inside of said case through said harness through-hole through the swivel member and slider through said slot to the outside of the case.

* * * * *